(12) United States Patent
Ceglarek et al.

(10) Patent No.: US 12,668,165 B2
(45) Date of Patent: Jun. 30, 2026

(54) METHOD FOR PERFORMING A MASSAGE PROGRAM AND VEHICLE SEAT SYSTEM

(71) Applicant: Faurecia Autositze GmbH, Hannover (DE)

(72) Inventors: Piotr Ceglarek, Katowice (PL); Rafal Strok, Walbrzych (PL); Edwin Valencia Rodriguez, Szczawno Zdroj (PL)

(73) Assignee: Faurecia Autositze GmbH, Hannover (DE)

( * ) Notice: Subject to any disclaimer, the term of this patent is extended or adjusted under 35 U.S.C. 154(b) by 21 days.

(21) Appl. No.: 19/036,368

(22) Filed: Jan. 24, 2025

(65) Prior Publication Data

US 2025/0249812 A1    Aug. 7, 2025

(30) Foreign Application Priority Data

Feb. 2, 2024    (DE) .......................... 102024103044.5

(51) Int. Cl.
*B60N 2/90*        (2018.01)
(52) U.S. Cl.
CPC .................................... *B60N 2/976* (2018.02)
(58) Field of Classification Search
CPC ................................ B60N 2/976; B60N 2/914
See application file for complete search history.

(56) References Cited

U.S. PATENT DOCUMENTS

| | | | | |
|---|---|---|---|---|
| 10,258,535 B2* | 4/2019 | Lem | ....................... | B60N 2/976 |
| 2012/0280554 A1* | 11/2012 | Brncick | ................... | B60N 2/64 |
| | | | | 297/452.41 |
| 2014/0346837 A1* | 11/2014 | Brncick | ................... | B60N 2/66 |
| | | | | 297/452.41 |
| 2016/0229320 A1* | 8/2016 | Lem | ....................... | B60N 2/976 |

(Continued)

FOREIGN PATENT DOCUMENTS

| | | |
|---|---|---|
| DE | 102015217044 A1 | 3/2017 |
| WO | 2019169471 A1 | 9/2019 |

OTHER PUBLICATIONS

Kim, D. Analysis of automotive seating systems in automated driving vehicles according to the changes of the interior environment— Functional option and design concepts, Google Scholar, Graduate School of Engineering Practice Thesis, Seoul National University, Feb. 2021, pp. 1-71. (Year: 2021).*

*Primary Examiner* — Russell Frejd
(74) *Attorney, Agent, or Firm* — Laurence P. Colton; Smith Tempel Blaha LLC

(57)        ABSTRACT

A method for performing a massage program carried out by a massage system that is part of a vehicle seat system that includes a vehicle seat with a backrest and a seat part, and a pneumatically operated massage system with N massage bladders. The method involves selecting and starting a massage program to define a sequence of bladders which are inflated or deflated, wherein the sequence is defined such that successively inflated bladders are adjacent to one another, wherein the bladders are inflated and deflated (Continued)

according to the sequence so that the bladders are inflated one after the other to a first pressure level. If the nth bladder in the sequence is inflated to the first pressure level, the pressure level of at least the (n+1)th bladder and/or the (n−1)th bladder in the sequence is at a pressure level lower than the first pressure level but greater than zero.

10 Claims, 6 Drawing Sheets

(56) References Cited

U.S. PATENT DOCUMENTS

| | | | |
|---|---|---|---|
| 2018/0104135 A1* | 4/2018 | Lem ..................... | A61H 9/0078 |
| 2020/0390641 A1* | 12/2020 | Arthurs .................. | B60N 2/976 |
| 2024/0025317 A1* | 1/2024 | Withey .................. | B60N 2/665 |
| 2025/0073104 A1* | 3/2025 | Balz ....................... | G16H 40/63 |

* cited by examiner

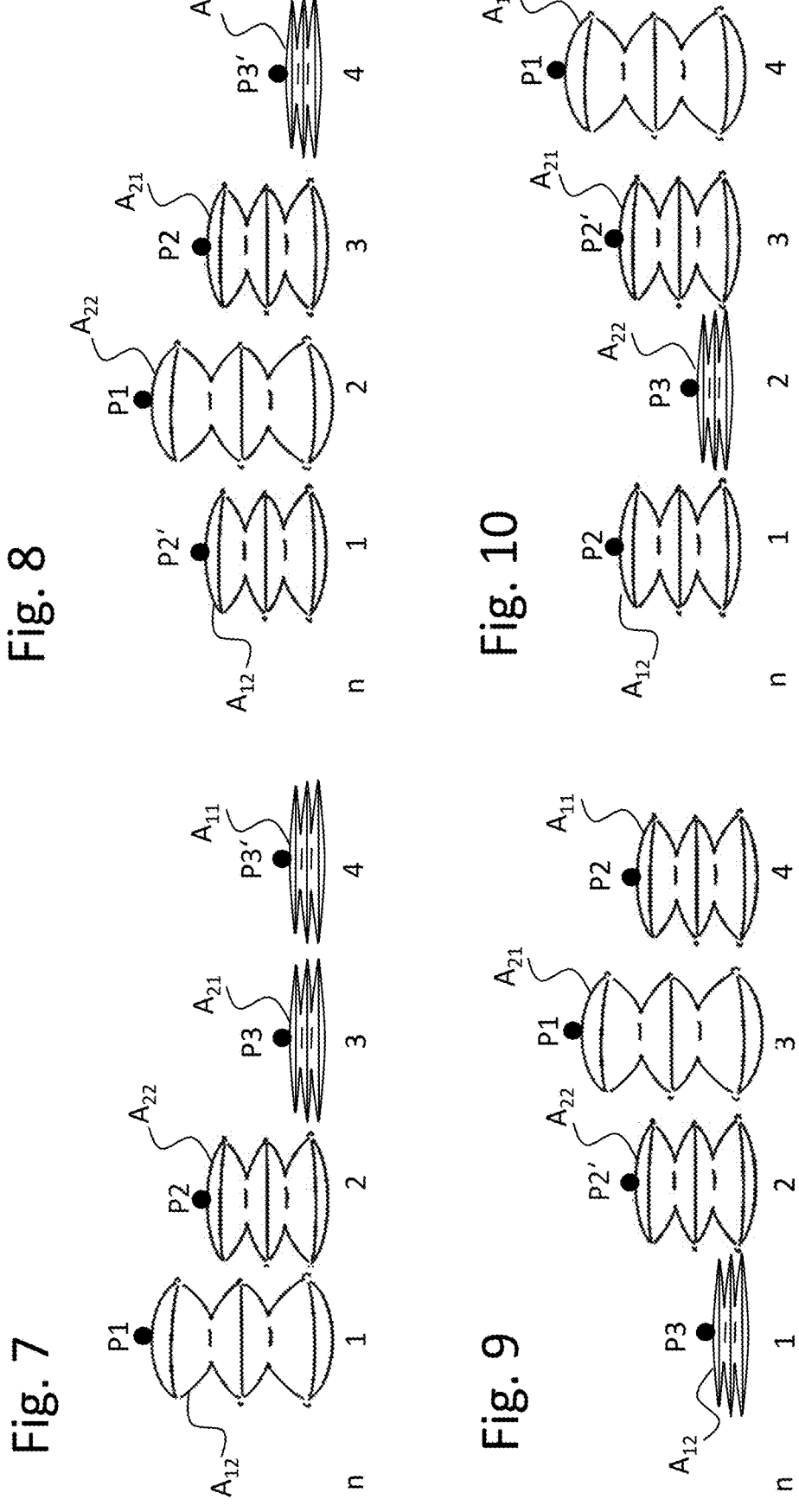

METHOD FOR PERFORMING A MASSAGE PROGRAM AND VEHICLE SEAT SYSTEM

STATEMENT OF RELATED APPLICATIONS

This application claims priority on and the benefit of German patent application no. 102024103044.5 having a filing date of 2 Feb. 2024.

BACKGROUND OF THE INVENTION

Technical Field

The invention relates to a method for performing a massage program and to a vehicle seat system.

Prior Art

It is known to equip vehicle seat systems with massage bladders to start massage programs that can massage different parts of the back or the buttocks and thigh region. These massage bladders are part of a pneumatically operated massage system, which is driven by a controller. Normally, such massages involve a sequence of pneumatically operated bladders, which are then filled or emptied. This often produces different effects, such as a spot massage at specific locations or a massage in which the pulse migrates. Unlike a manual massage, pressure is usually only applied to certain parts of the body of a person sitting on the vehicle seat by massage bladders being filled and emptied. Filling or emptying a sequence of bladders tends to cause the pressure point to migrate across the body. However, a manual massage often requires movements that are less like pressing at specific points and more like rubbing or kneading. With conventional massage systems this is only possible to a limited extent.

For example, WO 2019/169471 A1 discloses a system in which massage bladders are filled and emptied in a set sequence. The first massage bladder is filled, then the second massage bladder is filled and the first massage bladder is emptied, etc. In principle, however, this does not simulate a rubbing movement.

DE 10 2015 217 044 A1 describes a similar system in which the massage bladders are arranged in a matrix arrangement on the backrest of a seat.

BRIEF SUMMARY OF THE INVENTION

The object of the present invention is to provide a method for performing a massage program and a vehicle seat system in which the massage experienced by the user feels more like the rubbing effect of a manual massage.

This object is achieved by a method for performing a massage program by a massage system which is part of a vehicle seat system, wherein the vehicle seat system comprises the following: a vehicle seat with a backrest and a seat part, a pneumatically operated massage system with N massage bladders, wherein N is at least three, and wherein the method comprises the following: selecting and starting a massage program for defining a specific sequence of certain bladders which are inflated or deflated, wherein the sequence is defined such that successively inflated bladders are adjacent to one another, wherein the bladders are inflated and deflated according to the specific sequence so that the bladders are inflated one after the other to a first pressure level in accordance with the sequence, wherein the following applies: when the nth bladder in the sequence is inflated to the first pressure level, the pressure level of at least the (n+1)th bladder and/or the (n−1)th bladder of the sequence is at a pressure level which is lower than the first pressure level but greater than zero. This object is achieved as well as by a vehicle seat system for carrying out the method as taught herein, the vehicle seat system comprising a vehicle seat with a backrest and a seat part; a pneumatically driven massage system, wherein the massage system has massage bladders which can be inflated or deflated, wherein the massage bladders are arranged on the backrest and/or the seat part of the vehicle seat; a control device which controls a pneumatic system with pneumatic valves in such a way that the bladders are periodically inflated and deflated in a predetermined sequence. Advantageous embodiments can be found in the dependent claims.

The present invention is based on the concept that the massage bladders, which are also referred to below as just bladder or bladders, are inflated and deflated one after the other, wherein one bladder is filled to a predetermined maximum pressure and the pressure in the adjacent bladder that is in front or behind it in the sequence is not just reduced to a value that is reduced to below the perceptibility limit for the person being massaged. This results in the effect that the pressure exerted on one spot does not disappear again immediately, but continues to have an effect for a certain period of time. If this happens in a certain sequence, this gives the person the impression that, for example, the finger of a hand is moving across the body with a rubbing motion while pressure is being exerted.

The invention provides a method for performing a massage program. This is done by a massage system that is part of a vehicle seat system. For this purpose, the vehicle seat system comprises a vehicle seat with a backrest and a seat part and a pneumatically operated massage system with N massage bladders, wherein N is at least 3.

The method according to the invention comprises the following: Selecting and starting a massage program to define a specific sequence (n=1 . . . N) of certain bladders that are inflated or deflated. The sequence is defined in such a way that successively inflated bladders are adjacent to one another. The adjacent arrangement of the successive bladders can enhance the impression of a finger performing rubbing movements over the body. The bladders are inflated and deflated according to the specific sequence. This is done in such a way that the bladders are inflated one after the other to a first pressure level according to said sequence. According to the invention, the following condition applies: when the nth bladder in the sequence (1 . . . N) is inflated to the first pressure level, the pressure level of at least the (n+1)th bladder and/or the (n−1)th bladder in the sequence is at a second pressure level which is lower than the first pressure level but greater than zero. The pressure level of the (n+1)th bladder can be entirely different from the pressure level of the (n−1)th bladder. The (second) pressure level of the (n−1)th and/or (n+1)th bladder should at least be high enough that the pressure can still (just) be perceived by a person being massaged. For this purpose, it can be provided that this, preferably second, pressure level has a pressure value which is preferably between 20% and 80%, particularly preferably 30-80%, extremely preferably 50-80%, of the first pressure level. Accordingly, the pressure level of the (n+2)th and/or (n−2)th bladder can also be adjusted in relation to the (n+1)th bladder or (n−1)th bladder in the sequence.

The pressure levels of the bladders adjacent to the nth bladder, which is at the first pressure level, can be the same or different from one another. Usually, filling or emptying the bladders is a continuous process and therefore the pressure levels mentioned here can in principle be regarded as maximum pressures for the corresponding bladder in the sequence. It can be provided that the pressure levels of two bladders, between which the bladder filled to the first pressure level is arranged, are at least temporarily equal. In practice, however, one of these bladders will be filled while the other is being emptied. In this respect, this condition will often only be met for just a short time if the massage program does not provide for maintaining a certain pressure level. In principle, however, this can be inferred from the particular massage program that a user has started.

According to a preferred embodiment of the present invention, a third pressure level is also provided. If this is the case, the following condition applies: If the nth bladder in the sequence (1 . . . N) is inflated to the first pressure level and the pressure level of at least the (n+1)th bladder, preferably also the (n−1)th bladder, in the sequence is at a second pressure level—which is quite different from (n+1) as mentioned above for the bladders (n−1)—the (n+2)th bladder and preferably the (n−2)th bladder is at a, preferably third, pressure level which is preferably equal to or lower than the pressure level of the (adjacent) (n+1)th or (n−1)th bladder but is greater than zero.

For example, if the massage program provides that the nth bladder in a sequence specified by the massage program is to be inflated to a first pressure level P1, the (n+1)th bladder is brought to a second pressure level P2, which, as described above, is below the first pressure level P1. The previous bladder, the (n−1)th bladder, is then at a pressure level P2' that is equal to or different from pressure level P2 as long as it is below the first pressure level P1. Accordingly, a third pressure level can also be defined in the massage program, which can be occupied by the (n+2)th or (n−2)th bladders in the sequence in the situation described. Here too, the pressure level of the (n+2)th bladder can be P3 and that of the (n−2)th bladder can be P3', wherein P3 and P3' can be the same or different as long as they are below P2 or P2' respectively. A similar sequence can be seen, for example, in FIGS. 7-10. Unlike P2 and P2', P3 and P3' can be within a range that the person on the vehicle seat no longer perceives as pressure.

Overall, the method according to the invention thus causes the point at which the most pressure is generated on the person to be massaged to migrate over the arrangement of the massage bladders in the predetermined sequence. The person to be massaged then feels a movement and pressure being exerted that corresponds to, or at least comes very close to, the rubbing of a finger.

There are different ways to arrange massage bladders in a massage system. By means of the present invention, it is possible to perform massage programs if at least three massage bladders can be operated at at least two, preferably three, pressure levels. Since the body, and especially the muscles of the body, is/are arranged more or less symmetrically around a center line of the body, it is recommended to also use a corresponding massage system that provides a corresponding arrangement of the massage bladders.

According to a particularly preferred embodiment of the present invention, the massage system comprises a first and a second arrangement of massage bladders which can be inflated or deflated. Each arrangement comprises columns and rows of bladders. The massage system can be arranged on the backrest and/or the seat part of the vehicle seat. The first and second arrangements of bladders are preferably arranged on opposite sides of a center line of the backrest or seat part. In principle, the two arrangements are a single, matrix-like arrangement comprising rows and columns.

With such a matrix-like arrangement, any massage program can be performed, for example in which massages are carried out symmetrically to the body's center line. Preferably, the first and second arrangements of bladders are arranged symmetrically with respect to the center line of the backrest or the seat part. This means that for each bladder in the first arrangement there is a corresponding mirror bladder in the second arrangement. The mirror bladder has the same row number and the same distance from the center line as the corresponding bladder from the first arrangement.

If the massage programs are adjusted so that they provide symmetrical massages, the arrangement described can also save costs. A bladder and a corresponding mirroring bladder would then be filled or emptied simultaneously in accordance with the specified sequence. This can be achieved by supplying this pair of bladders with fluid, preferably air, for example via a common supply or deflation device, such as a valve. Thus, if the corresponding bladders are connected to a common supply or deflation device, preferably a valve, the method according to the invention can be controlled such that the corresponding bladders are always being inflated and deflated at the same time.

Of course, depending on the sequence provided by the massage program, it is also possible that more than one bladder, preferably more than one bladder of one or each arrangement, is inflated or deflated at the same time. These bladders, which are inflated or deflated simultaneously, may preferably be adjacent bladders. In general, adjacent bladders are those bladders with no other bladder in between. If adjacent bladders are simultaneously filled to a predetermined pressure level, the person to be massaged is given the impression that the massage is not only being carried out with one finger, but accordingly with several fingers or the entire hand due to the increase in the area of pressure. This enables additional massage programs to be realized.

In addition, the above-mentioned arrangement of rows and columns is not limited to a square or rectangular matrix. Rows with different numbers of bladders can exist. For example, bladders may be missing from points on a vehicle seat where there is typically little or no contact between a person and the seat. For this purpose, it can be provided that there is a smaller number of bladders in at least one row of an arrangement than in another row of the same arrangement.

The invention further relates to a vehicle seat system for carrying out the method described above. For this purpose, such a vehicle seat system comprises a vehicle seat with a backrest and a seat part as well as a pneumatically driven massage system, wherein the massage system comprises massage bladders that can be inflated or deflated. The massage bladders are arranged on the backrest and/or the seat part of the vehicle seat; furthermore, the vehicle seat system has a control device which drives a pneumatic system having pneumatic valves so that the bladders are periodically inflated and deflated in a predetermined sequence. The massage system may comprise a first and a second arrangement of massage bladders that can be inflated or deflated. Each arrangement is arranged in columns and rows of bladders on the backrest and/or the seat part of the vehicle seat. The first and second arrangements of the bladders are preferably arranged on opposite sides of a center line of the backrest or the seat part.

BRIEF DESCRIPTION OF THE DRAWINGS

The invention will be explained in more detail below with reference to FIGS. 1-12 and the embodiments shown therein.

FIGS. 7-10 show an exemplary sequence of a massage program using the example of the massage bladders shown in FIG. 6.

DETAILED DESCRIPTION OF PREFERRED EMBODIMENTS

Figure 1:
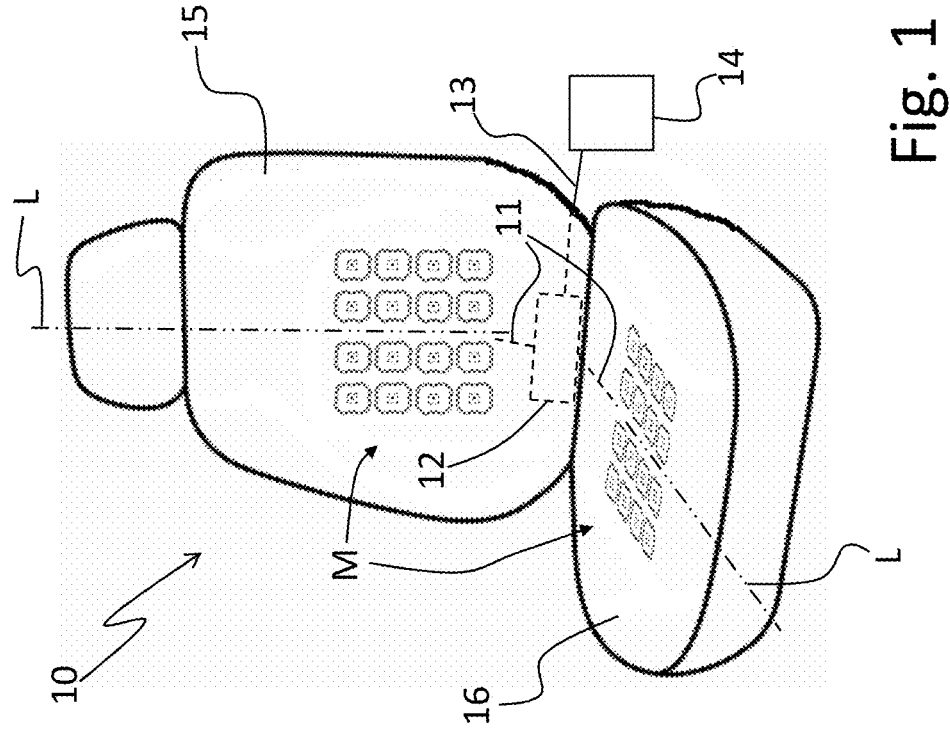
FIG. 1 shows a vehicle seat system according to the invention.

FIG. 1 shows a vehicle seat 10 with a seat part 16 and a backrest 15, wherein a massage system M according to the invention is arranged both in the backrest 15 and in the seat part 16. The massage system M comprises a plurality of bladders arranged symmetrically with respect to the center line L of the seat. The bladders are supplied with fluid by supply and deflation devices 11, which are connected on one side to one or more bladders and on the other side to a valve of a valve system 12. The massage system M is controlled by a control device 14 which is connected to the massage system M via a control line 13. It is not necessary for the control line 13 to be physically present; transmission can also take place via radio. The arrangement of the massage system M on the seat 10 or the seat elements 15, 16 is carried out according to the known prior art and will not be explained in more detail here.

Figure 2:
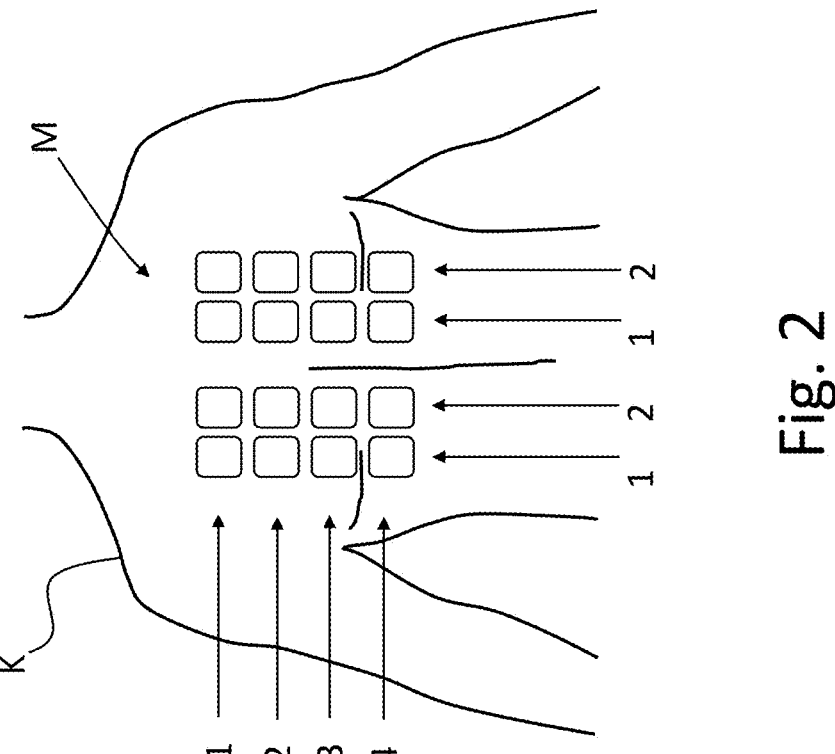
FIG. 2 schematically shows a first possible arrangement of massage bladders relative to a person to be massaged.

FIG. 2 shows a first embodiment of a massage system M according to the invention in relation to a body K, which can sit on a corresponding vehicle seat 10. In this case, the massage system M comprises, for example, sixteen bladders which are arranged in four columns symmetrically to the person's spine or to the center L of the backrest 15. Each column has four massage bladders arranged one above the other. The embodiment shown here is limited to the thoracic spine region of the back.

Figure 3:
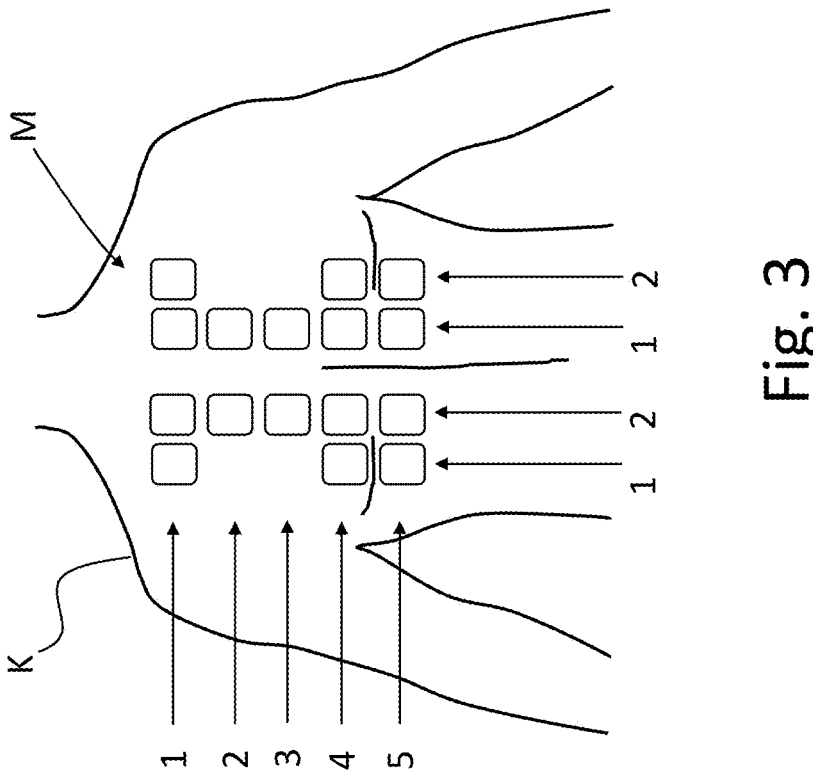
FIG. 3 schematically shows a second possible arrangement of massage bladders relative to a person to be massaged.

FIG. 3 shows a second embodiment of the massage system M. In comparison with the embodiment shown in FIG. 2, the number of massage bladders has remained constant, but these are arranged differently. In the columns closest to the spine, five massage bladders are arranged one above the other; in the columns arranged to the outside thereof, positions 2 and 3 (counted from the top) are not provided with massage bladders. The shoulder blades are located in this region and are not as sensitive to massage treatments; therefore, massage bladders do not need to be arranged at these points.

Figure 4:
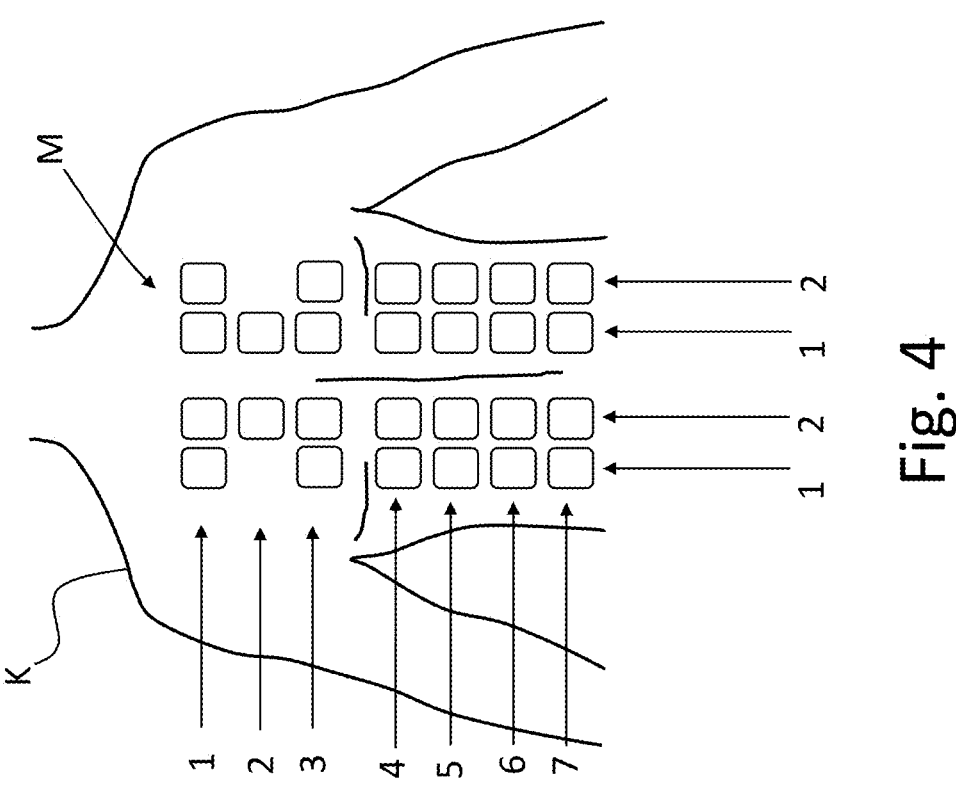
FIG. 4 schematically shows a third possible arrangement of massage bladders relative to a person to be massaged.

FIG. 4 schematically shows a third arrangement in a massage system M. The individual massage bladders are arranged next to one another in four columns, two to the left and two to the right of the spine. In the inner column, seven massage bladders are arranged one above the other and extend from the shoulder region to the lumbar region of the back. In the outer columns, counting from the top, there are no massage bladders in the second row, as they cover the region of the shoulder blades and would not work very effectively.

Figure 5:
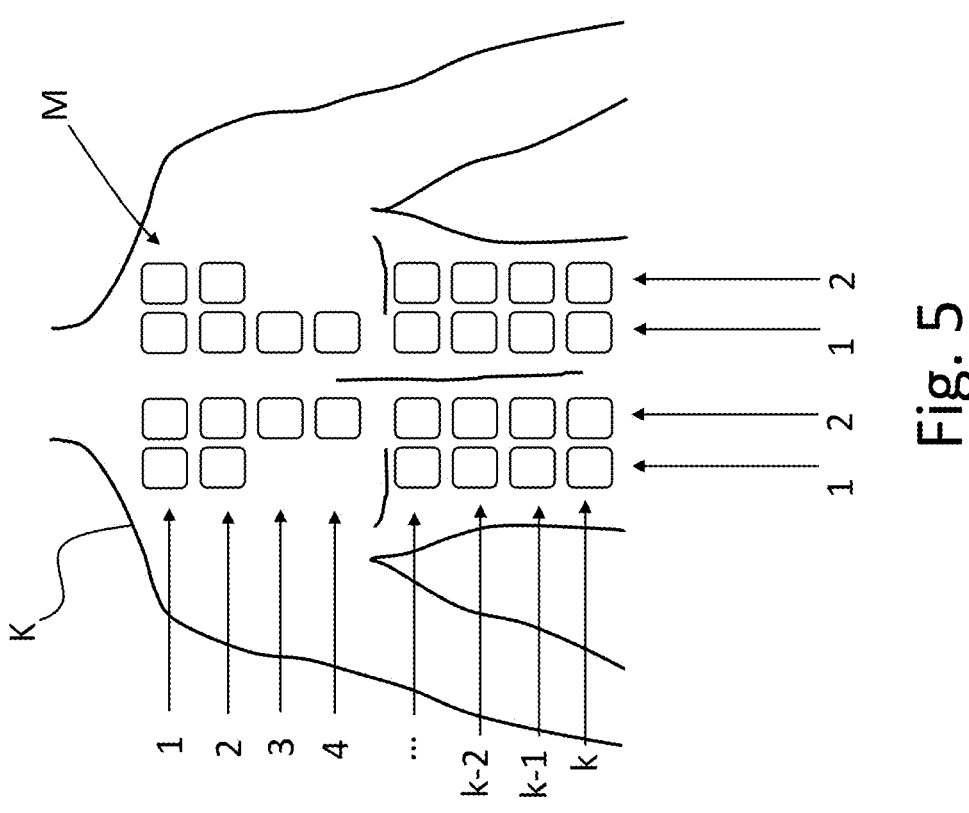
FIG. 5 schematically shows a fourth possible arrangement of massage bladders relative to a person to be massaged.

A fourth arrangement of massage bladders in a massage system M according to the invention is shown in FIG. 5. The massage bladders are again arranged in four columns, wherein any number of massage bladders can be arranged one above the other in the columns, which is indicated here by the number k. The columns extend from the upper shoulder region deep into the lower lumbar region. In the arrangement shown, the positions in rows 3 and 4 in the outer columns are missing massage bladders. This region is located in the region of the shoulder blades and can be disregarded.

The embodiments shown in FIGS. 2 to 5 represent merely exemplary arrangements of massage systems M in the backrest. The massage bladders for the buttocks and thighs can also be arranged in a variety of ways in the seat part, both in terms of their position relative to one another and in terms of the number of massage bladders. In addition, the number of columns in a massage system M according to the invention is not fixed at four (2 times 2). The system may also comprise six, eight or even more columns, in which case the supply and deflation device 11 would of course also become more complex. Furthermore, the massage system M can have one or more, for example matrix-like, arrangements A, A' (cf. FIGS. 6, 11 and 12, for example), each having rows and columns. Preferably, two arrangements A, A' that are symmetrical to the center line L are provided. The bladders of such arrangements are also generally referred to hereinafter as $A_{ij}$ in arrangement A or $A_{ij}'$ in arrangement A'.

Figure 6:
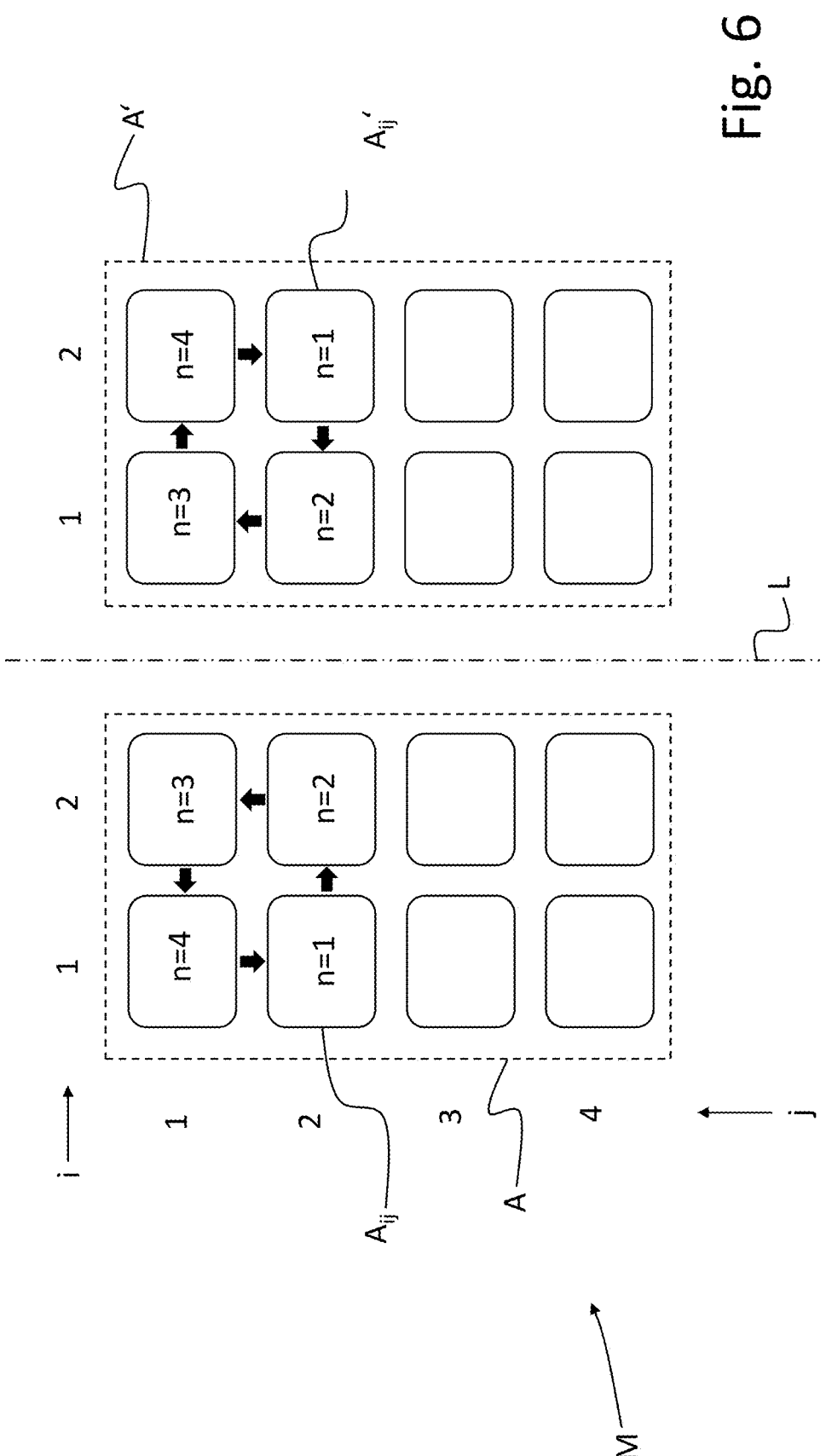
FIG. 6 shows an embodiment for a specific sequence of massage bladders to be filled and emptied using the example of the arrangement according to FIG. 2.

FIG. 6 schematically shows a method sequence for a massage system M, for example based on the exemplary arrangement according to FIG. 2. Two arrangements A, A' of massage bladders are shown here by way of example with $A_{ij}$ in arrangement A and $A_{ij}'$ in arrangement A'.

As an example, a circular massage movement is indicated in the upper half of the arrangements here, in which the movement on the left side is counterclockwise.

A massage program generally provides, independently of the embodiment, a sequence of N bladders with $A_{ij}$, or $A_{ij}'$, which are filled or emptied in a predetermined sequence. The sequence is usually designed such that adjacent bladders are filled one after the other to a maximum pressure B1. In the context of arrangements A, A', "adjacent" means that after bladder $A_{ij}$, the next bladder in the row or column or diagonal is filled. The indices i and j thus change in such a way that they change from the nth bladder to the (n+1)th bladder in the sequence by a number $a_n=0$, 1 or −1, wherein the change for i and j may still be 0 in both cases.

Mathematically, the indices change for a sequence of N bladders, which, starting with bladder $A_{ij}$ as the nth member of the sequence, is therefore preferably as follows:

$$i + \sum_{n=2}^{N} a_n; \, a_n \in \{0, \, \pm 1\}$$

$$j + \sum_{n=2}^{N} a_n; \, a_n \in \{0, \, \pm 1\}$$

In the example according to FIGS. 6 and 7-10, the following happens during one run-through of the sequence:

The maximum pressure P1 migrates from the bottom left (n=1; $A_{12}$) through bottom right (n=2; $A_{22}$) to the top right (n=3; $A_{21}$) and through top left (n=4; $A_{11}$) and back to the bottom left (n=1; $A_{12}$). The position of bladder $A_{ij}$ is defined by the column number i, counted from the left, and the row number j, counted from the top. The starting point $A_{12}$ means the bladder is in the first column from the left and the second row from the top. In this example, the movement on the right side is intended to be mirror-symmetrical to the spine. The maximum pressure P1 starts at the bottom right (n=1; $A_{22}'$). It continues clockwise to the left to the bladder next to it (n=2; $A_{12}'$). Then, the bladder arranged thereabove (n=3; $A_{11}'$) is filled with maximum pressure P1, the maximum pressure P1 then migrates over the bladder arranged to the right (n=4; $A_{21}'$) and back to the initial bladder arranged therebeneath (n=1; $A_{22}'$). This process can be repeated as often as desired, depending on the massage program.

FIGS. 7-10 show an exemplary sequence of a massage program using the example of the massage bladders $A_{ij}$ shown in FIG. 6. The massage sequence starts on the left side at n=1; the bladder $A_{12}$ (n=1) is filled up to the maximum pressure P1, which is preferably preset. This is shown in FIG. 7. At the same time, the advised bladder (n=2; $A_{22}$) is filled with the pressure P2. The pressure is lower than that of $A_{12}$; however, it is preferably still perceptible to the person sitting on the seat. The pressure P2 is preferably between 20 and 80% of the maximum pressure P1; a value between 30 and 80% of the maximum pressure P1 is particularly preferred, and a value between 50 and 80% of the maximum pressure P1 is extremely preferred. The noticeable partial filling of the subsequent massage bladder already indicates where the maximum pressure point P1 will migrate, which increases the impression of a moving pressure point; the pressure point no longer jumps from pressure bladder to pressure bladder, but instead appears to glide.

In the second step, shown in FIG. 8, the bladder n=2 ($A_{22}$) is filled with maximum pressure P1. At the same time, bladder $A_{12}$ (n=1) is emptied to the pressure P2' so that the pressure point moves smoothly from $A_{12}$ to $A_{22}$ and is thus perceived by the person sitting on the seat as a stroking movement from $A_{12}$ to $A_{22}$. At the same time, the next targeted bladder $A_{21}$ (n=3) is also filled to the perceptible pressure level P2. This tells the person on the seat where the pressure point will move to next.

FIG. 9 shows the third step. Bladder $A_{21}$ (n=3) is filled with maximum pressure P1. At the same time, the pressure of bladder $A_{22}$ (n=2) is reduced to the, preferably still perceptible, pressure P2', bladder $A_{12}$ (n=1) is emptied and bladder $A_{11}$ (n=4) is filled up to the, preferably still perceptible, pressure P2. Bladder $A_{12}$ does not have to be completely emptied; emptying to a pressure level P3, at which the person sitting on the seat preferably no longer feels the pressure of the corresponding massage bladder, is completely sufficient.

The fourth step is shown in FIG. 10. Bladder (n=4) $A_{11}$ is filled to the maximum pressure P1, the pressure of bladder $A_{21}$ is reduced to pressure level P2', bladder $A_{22}$ is emptied and the targeted bladder $A_{12}$ filled to pressure level P2. P2' and P2 can in principle be identical.

The fifth step corresponds to the first step described with respect to FIG. 7, such that a circular movement is performed which can be repeated as often as desired. The person sitting on the seat feels a circular movement in which the maximum pressure point flows from point to point, simulating the stroking movement of a massaging hand. The perception of the maximum pressure moves from one massage bladder to the next so as to simulate a movement of a hand moving with pressure.

Figures 11, 12:
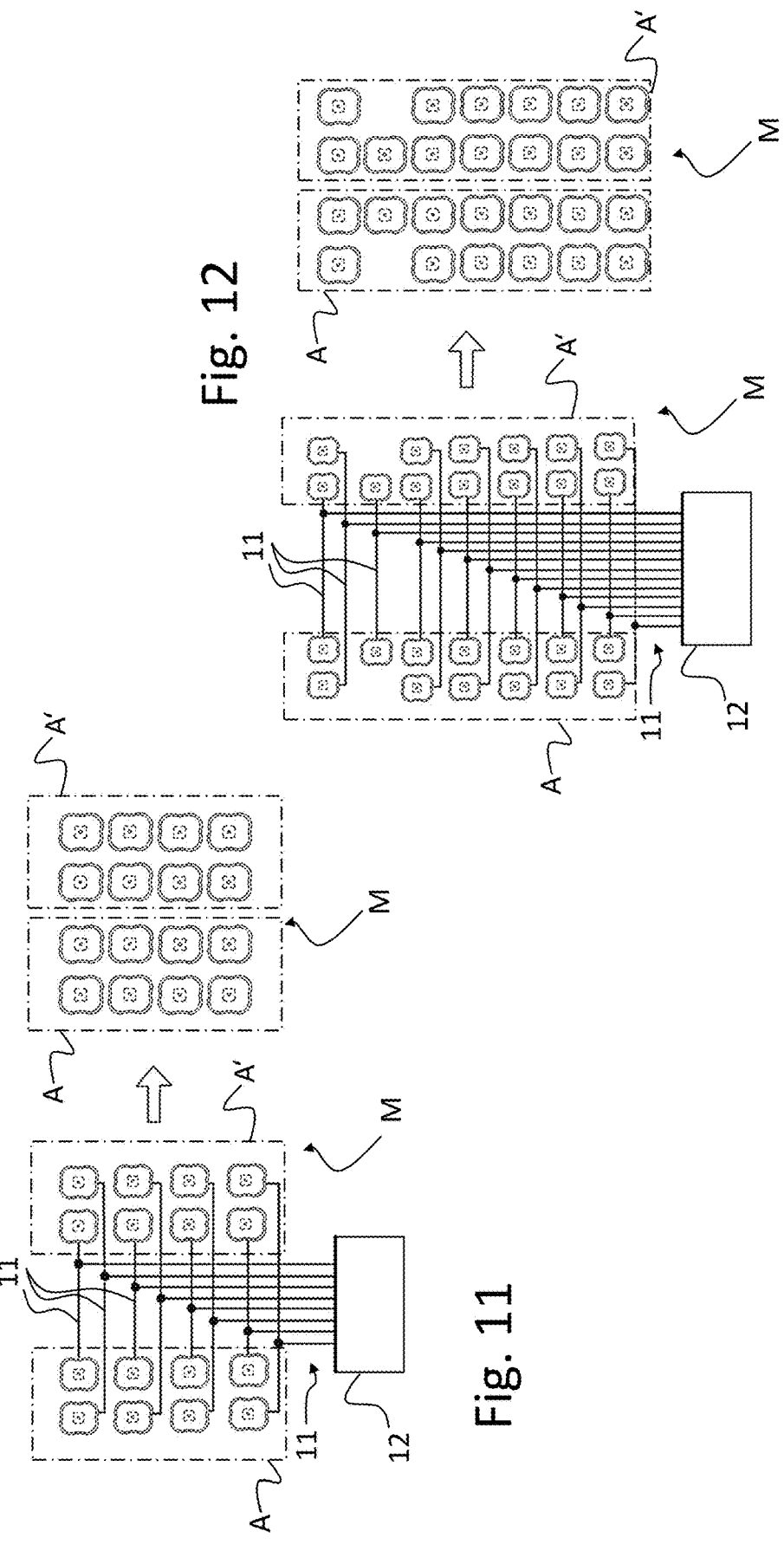
FIG. 11 shows a first possible fluidic connection of massage bladders using the example of the arrangement in FIG. 3.
FIG. 12 shows another possible fluidic connection of massage bladders to be filled and emptied using the example of the arrangement according to FIG. 4.

FIG. 11 shows a first possible fluidic connection of massage bladders using the example of the arrangement in FIG. 2. On the right side, the massage system M is shown together with its massage bladders, wherein the left two columns massage the left side of people's bodies and the right two columns massage the right side of the body. If the massage system is designed so that the massage is carried out symmetrically on the left and right sides, each bladder does not have to be driven individually, but the corresponding bladders on the left and right sides can be provided with a connected supply and deflation device 11, which reduces the line system and halves the number of valve units in the valve system 12. In this example, all sixteen massage bladders can be driven by eight valve units.

FIG. 12 shows another possible fluidic connection of massage bladders to be filled and emptied using the example of the arrangement according to FIG. 4, which is shown on the right side of the drawing. Here, too, the right and left sides are treated symmetrically, so that the corresponding massage bladders can again be connected together with the valve system 12 via a supply and deflation device.

This simplification of the supply and deflation device can only be achieved if the massage processes are to be carried out symmetrically on the left and right sides. In the event that other combinations of the two sides are to be possible, the simplification of the system must be dispensed with and each massage bladder must continue to be driven individually.

LIST OF REFERENCE SIGNS

10 Vehicle seat
11 Supply and deflation device
12 Valve, valve system
13 Control line
14 Control device
15 Backrest
16 Seat part
$A_{ij}$, Massage bladders
$A_{ij}'$ Mirror bladder to $A_{ij}$
K Body
L Center line
M Massage system
P1 Maximum pressure level
P2, P2' Pressure level pressure, preferably above the perception threshold
P3 Pressure level pressure, preferably below the perception threshold

What is claimed is:

1. A method for performing a massage program by a massage system (M) which is part of a vehicle seat system, wherein the vehicle seat system comprises the following: a vehicle seat (10) with a backrest (15) and a seat part (16), a pneumatically operated massage system (M) with N massage bladders ($A_{ij}$, $A_{ij}'$), wherein N is at least 3, and wherein the method comprises the following: selecting and starting a massage program for defining a specific sequence (n=1 . . . N) of certain bladders ($A_{ij}$, $A_{ij}'$) which are inflated or deflated, wherein the sequence is defined such that successively inflated bladders ($A_{ij}$, $A_{ij}'$) are adjacent to one another, wherein the bladders ($A_{ij}$, $A_{ij}'$) are inflated and deflated according to the specific sequence so that the bladders are inflated one after the other to a first pressure level (P1) in accordance with the sequence, wherein the following applies: when the nth bladder in the sequence (1 . . . N) is inflated to the first pressure level (P1), the pressure level of at least the (n+1)th bladder and/or the (n−1)th bladder of the sequence is at a pressure level (P2, P2') which is lower than the first pressure level (P1) but greater than zero.

2. The method according to claim 1, wherein when the nth bladder in the sequence (1 . . . N) is inflated to the first pressure level (P1) and the pressure level of at least the (n+1)th bladder and/or the (n−1)th bladder in the sequence is at the pressure level (P2, P2') that is below the first pressure level (P1), the (n+2)th bladder and/or the (n−2)th bladder is at a further pressure level (P3), which is preferably equal to or lower than the pressure level (P2, P2') of the (n+1)th or the (n−1)th bladder, but greater than zero.

3. The method according to claim 1, wherein the pressure levels (P2, P2') of the bladders adjacent to the nth bladder which is at the first pressure level (P1) are equal to or different from one another.

4. The method according to claim 1, wherein the massage system (M) comprises a first and a second arrangement (A, A') of massage bladders ($A_{ij}$, $A_{ij'}$) which can be inflated or deflated, wherein each arrangement (A, A') comprises columns (i) and rows (j) of bladders ($A_{ij}$, $A_{ij'}$) and is arranged on the backrest and/or the seat part of the vehicle seat, wherein the first and the second arrangement (A, A') of the bladders ($A_{ij}$, $A_{ij'}$) are arranged on opposite sides of a center line (L) of the backrest or seat part.

5. The method according to claim 4, wherein the first and second arrangements (A, A') of bladders ($A_{ij}$, $A_{ij'}$) are arranged symmetrically with respect to the center line (L) of the backrest or seat part so as to provide a corresponding mirror bladder ($A_{ij'}$) in the second arrangement (A') for each bladder ($A^{ij}$) in the first arrangement (A), wherein the mirror bladder (Aij') has the same row number (j) and the same distance from the center line (L) as the corresponding bladder ($A_{ij}$) in the first arrangement (A).

6. The method according to claim 5, wherein the corresponding bladders ($A_{ij}$, $A_{ij'}$) are connected to a common supply or deflation device, preferably a valve, so that the corresponding bladders are always inflated and deflated at the same time.

7. The method according to claim 1, wherein more than one bladder, preferably more than one bladder from one or each arrangement (A, A'), is inflated or deflated at the same time.

8. The method according to claim 4, wherein at least one row (j) comprises a smaller number (Mj) of bladders ($A_{ij}$, $A_{ij'}$) than another row of the same arrangement (A, A').

9. A vehicle seat system for carrying out the method according to claim 1, the vehicle seat system comprising:
a vehicle seat (10) with a backrest (15) and a seat part (16);
a pneumatically driven massage system (M), wherein the massage system (M) has massage bladders ($A_{ij}$, $A_{ij'}$) which can be inflated or deflated, wherein the massage bladders ($A_{ij}$, $A_{ij'}$) are arranged on the backrest (15) and/or the seat part (16) of the vehicle seat (10); and
a control device (14) which controls a pneumatic system with pneumatic valves (12) in such a way that the bladders ($A_{ij}$, $A_{ij'}$) are periodically inflated and deflated in a predetermined sequence.

10. The vehicle seat system according to claim 9, wherein the massage system (M) comprises a first and a second arrangement (A, A') of massage bladders ($A_{ij}$, $A_{ij'}$) which can be inflated or deflated, wherein each arrangement (A, A') is arranged in columns (i) and rows (j) of bladders ($A_{ij}$, $A_{ij'}$) on the backrest and/or the seat part of the vehicle seat, wherein the first and second arrangement (A, A') of bladders ($A_{ij}$, $A_{ij'}$) are preferably arranged on opposite sides of a center line (L) of the backrest (15) or the seat part (16).

* * * * *